Feb. 17, 1925.
A. F. KLASING
BRAKE OPERATING APPARATUS
Filed Sept. 6, 1921

Patented Feb. 17, 1925.

1,526,858

UNITED STATES PATENT OFFICE.

AUGUSTUS F. KLASING, OF CHICAGO, ILLINOIS, ASSIGNOR TO THE KLASING CAR BRAKE COMPANY, A CORPORATION OF COLORADO.

BRAKE-OPERATING APPARATUS.

Application filed September 6, 1921. Serial No. 498,827.

*To all whom it may concern:*

Be it known that I, AUGUSTUS F. KLASING, a citizen of the United States, residing at Chicago, in the county of Cook and State of Illinois, have invented certain new and useful Improvements in Brake-Operating Apparatus, of which the following is a specification.

My invention relates to apparatus for operating the brakes of a railway car and is concerned particularly with an apparatus of the type employing a rack arranged on the car connected by suitable transmission mechanism with the brake rigging underneath the car and adapted to be given movement in the direction of its length to take up slack in the brake connections and set the brake shoes against the car wheels.

One of the principal objects of the invention is to provide a simple, strong and compact mechanism which can be economically manufactured and installed for imparting movements to the rack member by repeated strokes of a hand lever, the latter being preferably arranged to oscillate in a vertical plane and so that it sets the brake when swung in an upward direction. The invention contemplates an arrangement of parts whereby the amplitude of movements of the hand lever may be varied to suit the convenience of the brakeman and the lever automatically disconnected from the rack at the end of each power stroke regardless of the length of such stroke, by merely moving, or allowing the lever to move by gravity, in the reverse direction, the rack being held between power strokes of the lever by a suitable detent device.

A particular object of the invention is to provide mechanism between the lever and rack whereby an angular movement of the lever through a relatively small arc will impart a very considerable longitudinal movement to the rack, thereby increasing the rapidity of take-up of the brake connections.

The invention contemplates a mechanism comprising an operating lever having a gear or pinion thereon to impart movement to a rack bar to which the brake rigging is connected. An important object of the invention, in this connection, is to provide an arrangement of parts whereby the pinion or gear instead of rotating on a fixed axis, has a rolling movement between the rack bar and an opposed rack. This arrangement not only gives increased movement to the rack bar, with consequent increase of take-up on the brake connections, but also diminishes the friction between the gear and rack bar so that power is economized and wear on the rack bar and gear teeth is minimized.

Another object is to construct the apparatus so that it will act in a positive and reliable manner.

Another object is to provide an apparatus of this type consisting of a small number of parts which will be cheap to manufacture, durable and easily assembled.

The invention has in view particularly a brake manipulating apparatus comprising a rocking member for changing the vertical movement of the rack to a horizontal pull on the brake rigging under the car body, and as it is desirable to avoid the use of a chain on the end of the car, I employ, preferably, a rod or other element for connecting the rack with the rocking member. With this general arrangement in view, one of the objects of the present invention is to connect the structure which supports and houses the rack with the car body by a pivotal mounting so as to maintain a proper alignment between the rack and connecting rod for all angular positions of the rocking member, thereby minimizing friction and making the apparatus more effective and reliable. This arrangement is also advantageous when the apparatus is mounted on the end of a box car because, in the first place, the apparatus is self adjusting to compensate for the bulging of the end wall of the car which is likely to occur as a result of cargo thrusts, or other stresses; and, in the second place, the apparatus may be adapted to different types of cars, that is, to cars requiring attaching means for the housing of different character, by merely changing the form of the attaching plate without any change in the housing itself.

The invention contemplates forming the rocking member with a curved surface over which the chain, extending to the brake rigging under the car, is flexed when the brakes are being set and, in this connection, one of the objects of the invention is to form this curved surface so that it approaches the axis of rotation of the rocking member in the direction from the point of attachment of the chain whereby the leverage of the rocking member on the chain is increased as the brakes approach the set position to give the apparatus increased power for forcing the brake shoes against the wheels.

While it will be possible to employ a rocking member having a rolling movement, that is to say, a movement of translation as well as a movement of rotation, I prefer to employ a rocking member or bell crank which turns on a fixed axis; and when a bell crank of this type is employed the invention provides certain novel constructions and arrangements whereby the bell crank may be mounted upon the car without the use of a separate pivot stud or bolt.

The invention consists of the new and improved constructions, arrangements and devices to be hereinafter described and claimed, for carrying out the above stated objects and such other incidental objects as will be mentioned in the description which follows of the preferred embodiment of the invention shown in the accompanying drawings.

The brake rigging of my invention is shown as applied to the end of a railway box car. The mechanism, however, might be used on other types of cars and given such location as the circumstances require.

Figures 10, 11, 12, 13, 14:
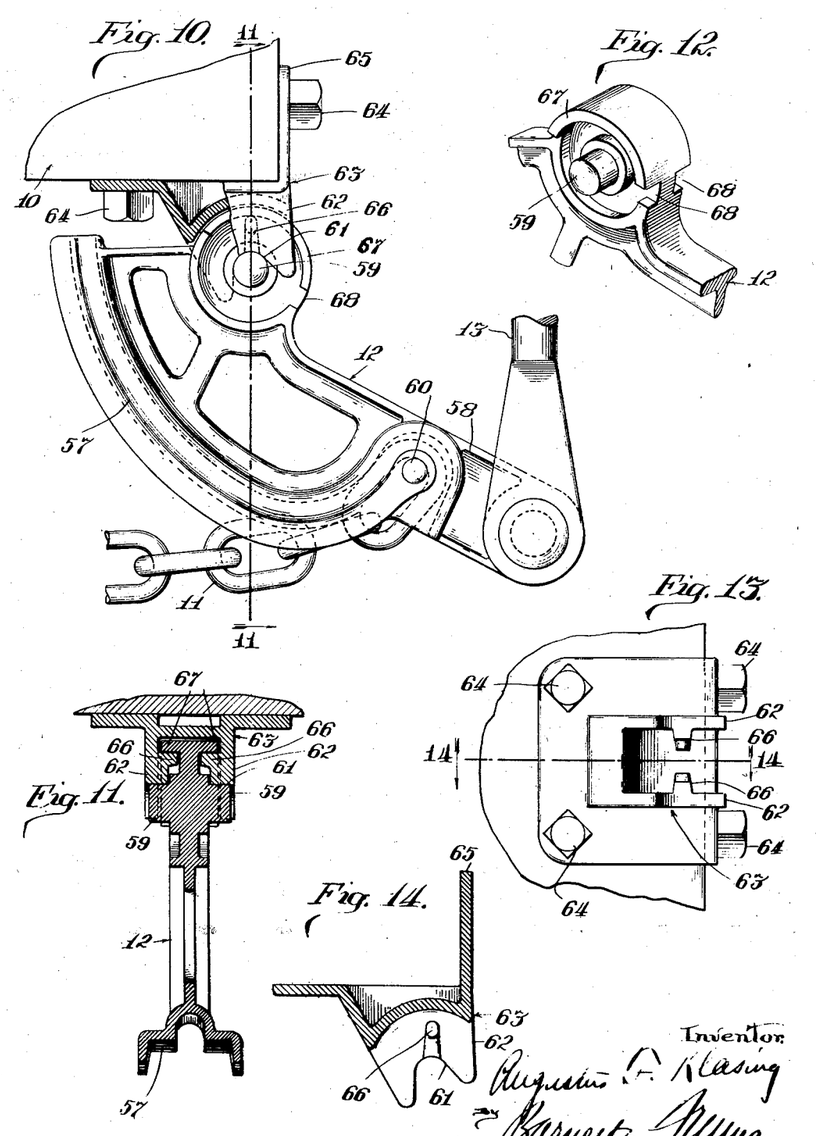
Fig. 10 is a side elevation, with certain parts in section, illustrating the preferred form of bell crank and device for pivoting the same to the car body.
Fig. 11 is a sectional view on line 11—11 of Fig. 10.
Fig. 12 is a fragmentary view, in perspective, of the bell crank.
Fig. 13 is an inverted plan view of the bracket for pivoting the bell crank to the car.
Fig. 14 is a sectional view on line 14—14 of Fig. 13.

Referring to the drawings, 10 designates the end wall of a railway box car. 11 (Fig. 10) is a chain attached to and forming part of the brake rigging on the under side of the car. An outward pull on the chain 11 takes up slack in the brake connections and then sets the brake shoes against the car wheels. 12 is a rocking member or bell crank to which chain 11 is attached and which is rocked by means of a substantially vertical pull rod 13. The rocking member may be of the rolling type shown in my pending application Serial No. 395,061 filed July 9, 1920, having a movement of translation as well as a rocking movement, but as shown herein, it preferably rocks on a fixed axis.

Figure 1:
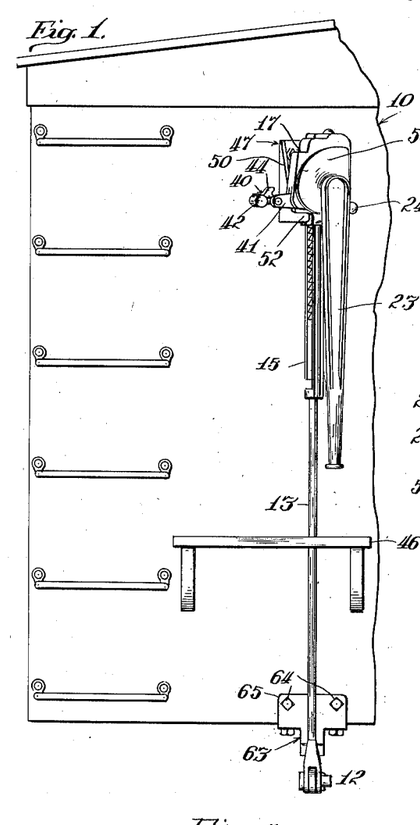
Fig. 1 is a fragmentary end elevation of a railway box car provided with the brake operating apparatus of my invention.
Figure 2:
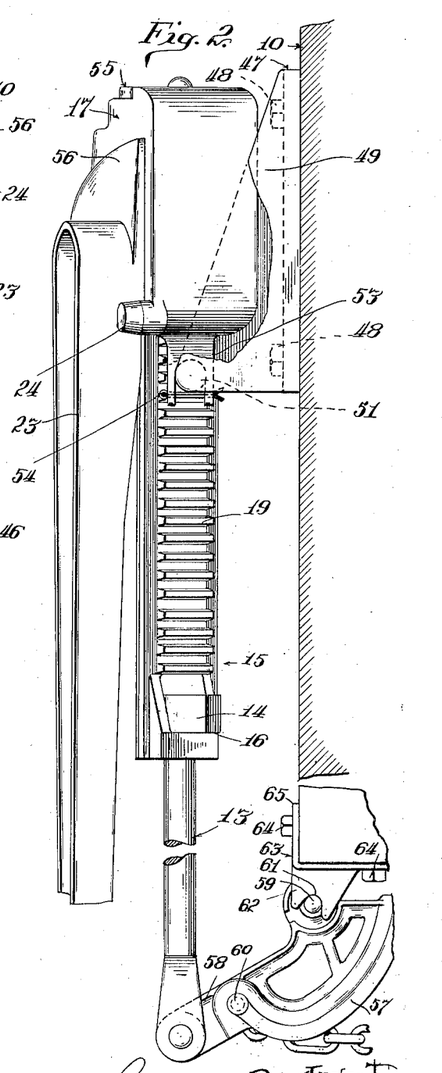
Fig. 2 is a longitudinal sectional view taken through the end of the car showing the apparatus, fragmentarily, in elevation.
Figure 3:
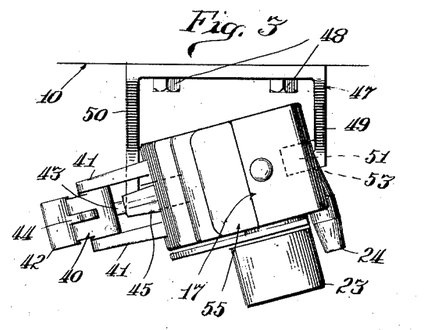
Fig. 3 is a plan view of the apparatus.
Figures 4, 5, 6, 7, 8, 9:
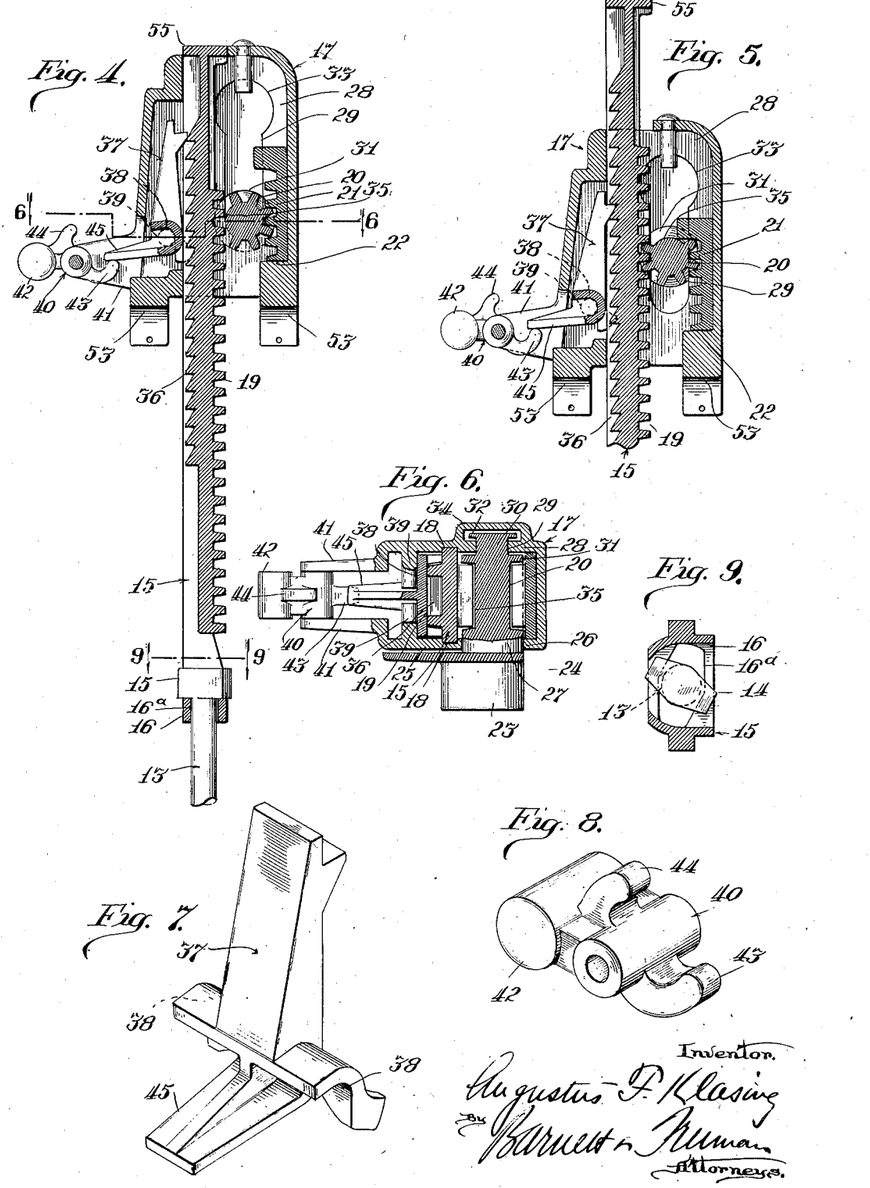
Fig. 4 is a longitudinal sectional view of the rack, its housing and associated parts, showing the rack in the normal or initial position.
Fig. 5 is a similar view showing the rack in a raised position.
Fig. 6 is a horizontal section on line 6—6 of Fig. 4.
Fig. 7 is a view, in perspective, of the detent for holding the rack in its elevated position.
Fig. 8 is a trip device which cooperates with the detent.
Fig. 9 is a sectional plan on line 9—9 of Fig. 4.

The pull rod 13 is formed with an elongated head 14 adapted to loosely engage the lower end of a rack bar 15, the latter being formed with a socket member 16 to engage the rod which is slotted at 16$^a$ transversely to the longer dimension of the head when the rod is in the assembled position, as shown in Fig. 9. The rack bar extends through a housing 17 which is secured to the end wall of the car preferably by a pivotal mounting to be hereinafter described. The rack bar is guided in slots 18 formed in the walls of the housing and is provided with teeth 19 adapted to be engaged by the teeth of a sector gear 20. Arranged within the housing and on the other side of sector gear 20 is a rack 21 which normally rests upon a shoulder 22 on the under side of the housing but is capable of sliding upwardly in said housing so as to permit the tooth of the gear first to engage the rack bar to mesh with the teeth of the rack bar at a point on substantially the same plane as that of the normal axis of rotation of the gear. With such construction it is unnecessary to subject the rack bar to a lateral thrust with the resultant grinding and wearing of the teeth of the gear and rack bar such as usually occurs when the first tooth of the gear is forced into engagement with a tooth of the rack at a point below the axis of rotation of the gear. This manner of effecting an initial engagement of the gear and rack bar is not so important when the brake mechanism is actuated to take up the slack preliminary to setting the brakes, but it is important when releasing the brakes. When the brakes are set, maximum power is ordinarily required to release them. It is, therefore, desirable to eliminate the lateral thrust on the rack bar during such operation. The gear 20 is rigid with and preferably an integral part of a lever 23 which, in its normal position, hangs vertically and against a stop 24 on the housing. The front wall 25 of the housing is formed with a guide slot 26 adapted to receive the inner hub portion 27 of the gear and the inner wall 28 of the housing is formed with a narrow slot 29 to receive the hub 30 on the outer end of the gear; the hub 30 lying between a pair of heads 31, 32. The slot 29 is formed at the top with an enlargement 33 through which head 32 can be passed in assembling the apparatus. The slot 29 is closed by a web or projecting portion 34 of the housing. An important advantage of this arrangement is that the parts in the housing when once assembled cannot be removed without detachment of the pull rod 13 from the rack bar and this involves detachment of the pull rod from the bell crank as the rod must be given a quarter turn to bring its head 15 in alignment with slot 16ª. That is, to disassemble the rack bar, rack and lever it is necessary to first remove the rack bar through the orifice in the top of the casing. Rack 21 may then be raised by turning the gear until it is out of mesh therewith and taken out of the housing through the bottom of the same. The lever and gear wheel can then be raised until the head 32 on the gear wheel aligns with the enlargement 33 which permits the gear to be pulled out of the housing laterally. This arrangement prevents unauthorized tampering with the apparatus, a contingency must always be provided against in the design of mechanism for freight car service.

The gear 20 is preferably formed integrally with the lever. This insures strength and gives the mechanism added simplicity while reducing the cost of manufacture. The gear teeth lie between the hub 27 and the head 31, the hub and head being of a diameter substantially the same as the major diameter of the toothed portion of the gear. This construction reinforces the teeth which, it will be understood, are liable to heavy stresses.

Gear 20 has been described as a sector gear. By this I intend a gear wheel or pinion having teeth extending only part way around its perimeter. In the normal or initial position of the parts of the apparatus the blank portion 35 of the gear faces the teeth 19 of rack bar 15, the gear being meshed with the teeth of rack 21.

The rack bar 15 is formed on the side opposite teeth 19 with holding teeth 36 adapted to be engaged by a detent 37 (Fig. 7) formed with bearing 38 for engagement with studs 39 on the housing. 40 is a trip pivoted to an extension 41 of the housing and provided with a weighted end 42 and lips 43, 44. When the lip 43 bears against the tail piece 45 of pawl 37 the pawl is brought into engagement with the holding teeth 36. By reversing the trip lip 44 bears against the upper side of the tail piece so as to hold the pawl out of engagement with the teeth 36.

The housing 17 is preferably mounted on the end of the car so that the lever 23 will oscillate in a vertical plane oblique to said wall, making more convenient the operation of the apparatus by the brakeman who stands on platform 46. As a preferred and important but not essential feature of my invention, the housing is pivotally connected with the end of the car. With this in view, a bracket is provided consisting of a plate 47 bolted at 48 to the end wall of the car and formed with outwardly projecting webs 49, 50, having gudgeons 51, 52 adapted to support the housing 17 which for that purpose is formed with depending forked bearings 53. Cotter pins 54 hold the housing in place on the gudgeons 51, 52.

Several advantages result from the pivotal support of the housing on the car: The rack bar will automatically adjust itself, through its capacity for shifting, to the changing position of the bell crank so that unnecessary friction is eliminated, especially between the gear, rack bar and rack. The rack bar, in other words, is self-aligning with respect to the direction of its pull. Side thrusts are eliminated.

This self-aligning feature of the rack-bar and its associated mechanism is also advantageous where the apparatus is arranged upon the end of the car or upon some structural part of the car liable to displacement or distortion in service. For example, the end of a railway box car is likely in time to bulge under the thrusts and pressures of the cargo. By pivoting the housing to the end of the car instead of fastening the same thereto rigidly the effect of the bulge on the alignment of the parts of the apparatus will be largely nullified. Furthermore, by attaching the housing to the car by means of a separate attaching plate a housing of uniform construction may be employed and the attaching plates modified for situations requiring different arrangements of attachment.

In order to prevent the lever from being oscillated too far in an upward direction the rack 21 is formed with a stop lug 21ª adapted to be engaged by the blank portion 35 of the gear wheel 20 when the latter has been rotated and raised to a given position.

As it is desirable to house as completely as possible the moving parts of the mechanism, the rack bar 15 is formed with a head 55 which, when the rack bar is in its initial position, closes the orifice in the top of the casing through which the rack bar moves when raised. With the same general purpose in view, the lever 23 is provided with a cover plate 56 which extends over the slot 26 in the outer wall of the housing.

The bell crank 12 is formed with a curved, channeled web 57 to receive the chain 11 which is shown as attached to an arm 58 on the bell crank projecting outwardly from the curved portion 57. The latter is formed on a curve eccentric with respect to the center of rotation of the bell crank. That is to say, the channeled web 57 is formed so as to gradually approach the gudgeons 59 on which the bell crank rotates in the direction away from the point of attachment 60 of chain 11 so that the lever arm acting upon the chain is shortened as the brakes approach the set position giving maximum power when the brake shoes are to be pressed against the wheels of the car. The bell crank is formed with gudgeons 59, 59, as stated, which are adapted to bear against curved surfaces 61 formed on the lower edges of a pair of spaced depending flanges 62 formed on a casting or bracket member 63 bolted, as indicated at 64, 64, to the under side of the car body and formed preferably with a flange 65 overlapping the end of the car body. The flanges 62 are formed with inwardly projecting studs 66, 66 forming a support for an arcuate web 67 on the bell crank. This web is formed with a pair of notches 68, 68 arranged so that the bell crank may be engaged with the bracket member 63 by placing the bell crank in such position with respect to the bracket that notches 68 will register with the studs 66. This position of assembling and disassembling is, of course, outside of the operative range of angular movement of the bell crank so that when the installation has been completed, disengagement of the bell crank from the bracket is impossible without disassembling the entire apparatus.

Operation: Figs. 1, 2, 3, 4 and 6 show the parts of the mechanism in their initial or normal positions. The operating lever 23 is hanging downwardly and the blank portion 35 of gear 20 faces the teeth 19 of the rack bar. To set the brakes the brakeman oscillates lever 23 upwardly giving the lever whatever number of movements is required to take up the slack in the brake connections and force the brake shoes against the wheels. The upward pull on the lever rotates gear 20 bringing its teeth into engagement with the teeth 19 of the rack bar. At the same time the gear wheel rides up on the rack 21.

Several advantages accrue from the arrangement of a sliding rack meshed by the actuating gear which raises the rack bar. In the first place, the rack bar is given a multiplied movement due to the travel of the gear on the rack. In the second place, friction of the parts is diminished. The gear rolls on the rack and the rack bar has a rolling movement, so to speak, over the gear. Friction between the gear and the rack bar is consequently diminished resulting in increased power and decreased tendency on the part of the rack bar and gear teeth to wear or become broken. Finally, the arcuate meshing of the gear teeth with the rack bar teeth is insured.

At the end of the power stroke, which may be of any amplitude to suit the convenience of the brakeman, the lever 23 is moved in the reverse direction or allowed to move in such direction by gravity, the gear wheel turning in the reverse direction and climbing the rack bar 19 which is held from downward movement by the detent 37. This movement of the gear wheel is possible because of the capacity of rack 21 to slide upwardly. In Fig. 5 the gear wheel is represented as being in the position which it assumes at the end of a power stroke. When the operating lever is dropped the gear wheel will rotate in the counterclockwise direction as shown in Fig. 5. When the lever reaches a vertical position, or near it, the teeth of the gear are disengaged from the teeth 19 of the rack bar, the blank portion 35 of the gear is presented to the rack bar and the gear and lever slide downwardly to their initial position (Fig. 4), the rack 21 being carried back with the gear. To release the brakes the trip 40 is turned from the position shown in Figs. 4 and 5 to a position bringing lip 44 into engagement with the tail piece 45 of the detent. The lever 23 is raised a trifle, just enough to relieve the detent from the rack, whereupon the trip device rocks the detent out of engagement with teeth 36 so that the rack bar may fall to its normal position.

Because of the eccentric shape of the surface of the bell crank over which chain 11 is flexed when the brakes are being set, the lever arm of the bell crank which operates to pull the chain is shortened as the brakes approach their set position, thereby increasing the power exerted by the apparatus at the time the brake shoes are pressed against the wheels of the car.

I claim:

1. In apparatus of the character described, the combination of a longitudinally movable rack bar, an oppositely arranged rack, a sector gear interposed between said rack bar and rack, and means for rotating said gear, the aforesaid rack being movable in parallelism with the rack bar, for the purpose described.

2. In apparatus of the character described, the combination of a longitudinally movable rack bar, an oppositely arranged rack, a sector gear interposed between said rack bar and rack, and a lever rigidly connected with said gear, the rack being movable in parallelism with the rack bar, for the purpose described.

3. In apparatus of the character described, the combination of a longitudinally movable rack bar, an oppositely arranged rack, a sector gear interposed between the rack bar and rack, means for rotating said gear, and means for limiting the amplitude of rotation of the gear, the rack being movable in parallelism with the rack bar, for the purpose described.

4. In apparatus of the character described, the combination of a longitudinally movable rack bar, an oppositely arranged rack and a sector gear interposed between the rack and rack bar, meshed with the rack and in the initial position of the parts of the mechanism having its blank portion presented to the teeth of the rack bar, said rack being movable in parallelism to the rack bar and in the direction in which movement is imparted to the rack bar by said gear.

5. In apparatus of the character described, the combination of a longitudinally movable rack bar, an oppositely arranged rack, a sector gear interposed between the rack and rack bar, meshed with the rack and in the initial position of the parts of the mechanism having its blank portion presented to the teeth of the rack bar, said rack being movable in parallelism to the rack bar and in the direction in which movement is imparted to the rack bar by said gear, and a stop projection on the rack adapted to limit the amplitude of rotation of the gear.

6. In apparatus of the character described, the combination of a longitudinally movable rack bar, an oppositely arranged rack, a sector gear interposed between the rack and rack bar, meshed with the rack and in the initial position of the parts of the mechanism having its blank portion presented to the teeth of the rack bar, said rack being movable in parallelism to the rack bar and in the direction in which movement is imparted to the rack bar by said gear, and a stop projection on the rack adapted to be engaged by the blank portion of the gear, for the purpose specified.

7. In apparatus of the character described, the combination of a longitudinally movable rack bar, an oppositely arranged rack, an operating lever, and a sector gear fixed to said lever and interposed between the rack and rack bar, meshed with the rack and, in the initial position of the parts of the mechanism, having its blank portion presented to the rack bar teeth, said rack being movable in parallelism to the rack bar and in the direction in which movement is imparted to the rack bar by the gear.

8. In apparatus of the character described, the combination of a substantially vertically arranged rack bar and mechanism for raising the same comprising an upwardly movable rack, a sector gear interposed between the rack bar and rack, and means for rotating said sector gear.

9. In apparatus of the character described, the combination of a substantially vertically arranged rack bar and mechanism for raising the same comprising an upwardly movable rack, a sector gear interposed between the rack bar and rack, means for rotating said sector gear, and a detent device for holding the rack bar in raised position.

10. In apparatus of the character described, the combination of a substantially vertically arranged rack bar and mechanism for raising the same comprising an upwardly movable rack, a sector gear interposed between the rack bar and rack, and a lever rigid with the gear and positioned thereon so that when the lever hangs vertically the blank portion of the gear is presented to the rack bar.

11. In apparatus of the character described, the combination of a substantially vertically arranged rack bar and mechanism for raising the same comprising an upwardly movable rack, a sector gear interposed between the rack bar and rack, a lever rigid with the gear and positioned thereon so that when the lever hangs vertically the blank portion of the gear is presented to the rack bar, and a stop projection on the upper end of the rack adapted to be engaged by the blank portion of said sector gear.

12. In apparatus of the character described, the combination of a housing, a substantially vertical rack bar extending through said housing, a rack vertically movable in said housing, a sector gear interposed between said rack and rack bar with its blank portion presented to the rack bar teeth when the rack bar is in its lower position, and a lever on said gear.

13. In combination with a railway car and its brake rigging, a rocking transmission element, a pull rod connected with the same, mechanism comprising a lever for imparting substantially longitudinal movement to the pull rod, and means for pivotally supporting said mechanism on the car on an axis at an angle with respect to the axis about which said lever has its operative stroke.

14. In combination with a railway car and its brake rigging, a rocking transmission element, a pull rod connected with the same, a rack connected with said pull rod, mechanism for imparting longitudinal movement to the rack, and a housing for said mechanism which is pivotally supported on the car.

15. In combination with a railway car and its brake rigging, a rocking transmission mechanism, an element connected therewith movable substantially in the direction of its length, mechanism comprising a member rotatable about a horizontal axis for imparting longitudinal movement to said element, and means for pivotally supporting said mechanism on the car on a horizontal axis substantially perpendicular to that of said rotatable member.

16. In combination with a railway car and its brake rigging, a power applying device, a rocking transmission element, and a connection between said power applying device and transmission element, the power applying device being pivotally mounted on the car on an axis extending transversely of the car.

17. In combination with a railway car and its brake rigging, apparatus for operating the brake rigging comprising a longitudinally movable member, means connecting the same with the brake rigging, and means for imparting movement to said longitudinally movable member, said longitudinally movable member and the means for imparting movement thereto being pivotally mounted on the car.

18. In combination with a railway car and its brake rigging, apparatus for operating the brakes comprising a longitudinally movable member connected to the brake rigging and mounted on the car so as to be capable of an angular shift of position, and means for applying power to move said member longitudinally.

19. In combination with a railway car and its brake rigging, apparatus for operating the brakes comprising a rack bar connected to the brake rigging and mounted on the car so as to be capable of angular shift of position, and means for applying power to said rack bar to move the same longitudinally.

20. In combination with a railway car and its brake rigging, apparatus for operating the brakes comprising a rack bar connected to the brake rigging and mounted on the car so as to be capable of angular shift of position, and means comprising a gear engaging said rack for moving the same longitudinally.

21. In combination with a railway car and its brake rigging, mechanism for operating the brakes comprising a rack bar and a gear for imparting longitudinal movement to the rack bar, and means for mounting said mechanism on the car which permits a shift in the angular position of the rack bar.

22. In combination with a railway car and its brake rigging, mechanism for operating the brakes comprising a housing pivoted to the car, a rack bar extending through said housing and connected with the brake rigging, a rack oppositely arranged to the rack bar, and a gear operatively interposed between said rack bar and rack.

23. In combination with a railway car and its brake rigging, mechanism for operating the brakes comprising a rack bar, a housing open at the bottom and having an orifice in the top just large enough to allow the rack bar to pass through, and formed in opposite side walls, respectively, with a relatively wide and relatively narrow slot, the latter terminating at the top in an enlargement, a vertically slidable rack in said housing, a lever provided with a sector pinion rigid therewith which projects into the housing and is meshed with said rack bar and rack, and a head on the end of the sector gear remote from the lever adapted to pass through said enlargement in the assembly of the parts and to engage the side wall along said narrow slot, said rack bar, gear and rack being arranged so that they can be disassembled only by removing the rack bar from the housing through said orifice in the top of the same.

24. In combination with a railway car and its brake rigging, mechanism for operating the brakes comprising a rack bar, and a lever having formed integral thereon and at right angles thereto a gear which is adapted to engage said rack bar, said gear comprising a toothed portion and hub portions at opposite ends of the toothed portion of a diameter substantially the same as the major diameter of the toothed portion for the purpose of reinforcing said teeth.

25. In combination with a railway car and its brake rigging, mechanism for operating the brakes comprising a housing formed on opposite side walls with slots, a rack bar extending through said housing, an oppositely arranged rack in the housing, and a lever having rigid therewith a gear meshing with said rack bar and rack having hub portions to guide the gear in said slots.

26. In combination with a railway car and its brake rigging, mechanism for operating the brakes comprising a housing formed on opposite side walls with slots, a rack bar extending through said housing, an oppositely arranged rack in the housing, a lever having rigid therewith a gear meshing with said rack bar and rack having hub portions to guide the gear in said slots, said gear being formed with a circular head near its end remote from the lever which bears against the inner side of the housing.

27. In combination with a railway car and its brake rigging, mechanism for operating the brakes comprising a housing formed on opposite side walls with slots, a rack bar extending through said housing, an oppositely arranged rack in the housing, a lever having rigid therewith a gear meshing with said rack bar and rack having hub portions to guide the gear in said slots, said gear being formed with a circular head near its end remote from the lever which bears against the inner side of the housing, and the head and hub adjacent the lever being of a diameter substantially equal to the major diameter of the toothed portion of the gear.

28. In combination with a railway car and its brake rigging, mechanism for operating the brakes comprising a rack bar, a housing for the same open at the bottom and having an orifice at the top through which the rack bar extends, a rack slidably arranged in the housing, and a lever provided with a gear adapted to mesh with said rack bar and rack, said rack bar, rack and gear being arranged so that they can be taken from the housing only by removing said rack bar through the orifice in the top of the housing.

29. Brake operating mechanism comprising, in combination with a power applying device and the brake rigging, a bell crank for transmitting power from the former to the latter, and a supporting bracket on the car, said bell crank and bracket being formed with coengaging elements providing a pivotal mounting for the bell crank, which elements are engageable and disengageable only when the bell crank stands at an angular position with respect to the bracket outside of the possible range of movement of the bell crank when the apparatus is assembled.

30. Brake operating mechanism comprising, in combination with a power applying device and the brake rigging, a bell crank for transmitting power from the former to the latter formed with gudgeons and with an arcuate web, and a supporting bracket on the car formed with depending webs providing bearings for said gudgeons and having inwardly projecting studs adapted to extend under said arcuate web, said web being notched to permit the mounting of the bell crank when in a position outside of the normal range of movement of said bell crank.

31. In combination with a railway car and its brake rigging, mechanism for operating the brakes comprising a power applying device, a rocking member connected with the brake rigging and with said power applying device, said rocking member being formed with integral gudgeons and provided with a laterally projecting web, and means on the car body providing bearings for said gudgeons and formed with a projection adapted to cooperate with said lateral web to maintain the rocking member in operative position.

32. In apparatus of the character described, the combination of a vertically movable rack bar, an oppositely arranged rack movable in parallelism with the rack bar, and a lever having a sector gear thereon interposed between the rack bar and rack, which gear, when the lever is raised, engages and lifts the rack bar, and which, when the lever is released, is turned by the weight of the lever, the rack being lifted at the same time, so as to be free from the rack bar.

33. In apparatus of the character described, the combination of a longitudinally movable rack bar, an oppositely arranged rack, a sector gear interposed between said rack bar and rack, and means for rotating said gear, the aforesaid rack being movable independently of the movement of the rack bar, for the purpose described.

34. In apparatus of the character described, the combination of a longitudinally movable rack bar, an oppositely arranged rack, a sector gear interposed between said rack bar and rack, and means for rotating said gear, the aforesaid rack and gear being movable independently of the movement of the rack bar, whereby a tooth of said gear may be meshed with the teeth of the rack bar on a plane with that of the normal axis of rotation of said gear.

35. In apparatus of the character described, the combination of a longitudinally movable rack bar, an oppositely arranged rack, a sector gear interposed between said rack bar and rack, and means for rotating said gear, the aforesaid rack and gear being movable independently of the rack bar, whereby a tooth of said gear may be preliminarily engaged with the teeth of the rack bar on a plane with that of the normal axis of rotation of said gear.

36. In an apparatus for manipulating the brakes of a railway car, the combination of a longitudinally movable rack bar, a sector gear adapted to be moved into and out of engagement with said rack bar, means for operating said gear, and means for supporting said gear with capacity for movement parallel with the rack bar, whereby a tooth of said gear may be meshed with the teeth of said rack bar on a plane with that of the normal axis of rotation of said gear.

37. In an apparatus for manipulating the brakes of a railway car, the combination of a longitudinally movable rack bar, a sector gear adapted to be rotated into and out of engagement with said rack bar, means for operating said gear and means for supporting said gear with capacity for movement parallel with the rack bar, whereby a tooth of said gear may be meshed with the teeth of said rack bar on a plane with that of the normal axis of rotation of said gear.

38. In an apparatus for manipulating the brakes of a railway car, the combination of a longitudinally movable rack bar, a sector gear adapted to be rotated into and out of engagement with said rack bar, means for operating said gear, and means for supporting said gear with capacity for independent initial movement parallel with the rack bar, whereby a tooth of said gear may be meshed with the teeth of said rack bar on a plane with that of the normal axis of rotation of said gear.

39. In an apparatus for manipulating the brakes of a railway car, the combination of a longitudinally movable rack bar, a sector gear adapted to be rotated into and out of engagement with said rack bar, means for operating said gear and means for supporting said gear adjacent said rack with capacity for movement parallel with the rack bar whereby a tooth of said gear may be meshed with the teeth of said rack bar on a plane with that of the normal axis of rotation of said gear.

AUGUSTUS F. KLASING.